United States Patent [19]

Fukushima

[11] Patent Number: 5,633,471

[45] Date of Patent: May 27, 1997

[54] PRESSURE SENSITIVE ELEMENT AND A STYLUS PEN WITH PRESSURE SENSITIVE FUNCTION

[75] Inventor: Yasuyuki Fukushima, Saitama, Japan

[73] Assignee: Wacom Co., Ltd., Saitama, Japan

[21] Appl. No.: 392,307

[22] Filed: Feb. 22, 1995

[30] Foreign Application Priority Data

Jan. 13, 1995 [JP] Japan ................................ 7-021162

[51] Int. Cl.⁶ ........................................................ G01L 5/00
[52] U.S. Cl. ............................................. 73/865.4; 178/18
[58] Field of Search ......................... 73/862.041, 862.541, 73/865.4; 364/709.11

[56] References Cited

U.S. PATENT DOCUMENTS

| | | | |
|---|---|---|---|
| 3,528,295 | 9/1970 | Johnson et al. | 73/862.541 |
| 3,621,720 | 11/1971 | Clark | 73/865.4 |
| 4,111,052 | 9/1978 | Sniderman | 73/432 R |
| 4,513,437 | 4/1985 | Chainer et al. | 73/865.4 |
| 4,896,543 | 1/1990 | Gullman | 73/862.541 |
| 5,060,527 | 10/1991 | Burgess . | |
| 5,422,959 | 6/1995 | Lee | 73/865.4 |

FOREIGN PATENT DOCUMENTS

| | | |
|---|---|---|
| 283 250 A3 | 9/1988 | European Pat. Off. . |
| 359 533 A1 | 3/1990 | European Pat. Off. . |
| 4-71108 | 5/1992 | Japan . |

*Primary Examiner*—Elizabeth L. Dougherty
*Assistant Examiner*—Ronald Biegel
*Attorney, Agent, or Firm*—Lowe, Price, LeBlanc & Becker

[57] ABSTRACT

A pressure sensitive element is arranged around a core unit along the longitudinal axis of a stylus pen (10) to detect the pressure applied to the core unit. The pressure sensitive element comprises a pressure transmittable member (30b), in an annular plate shape, for transmitting the pressure applied in the axial direction of the pressure sensitive element, a pressure sensitive member (28), in an annular plate shape, arranged coaxially in parallel to the pressure transmittable member, and a support member (18b) for supporting the pressure sensitive member between the support member against the applied pressure, arranged coaxially in parallel to the pressure transmittable member. The core unit is a push and thrust type writing unit (14).

9 Claims, 10 Drawing Sheets

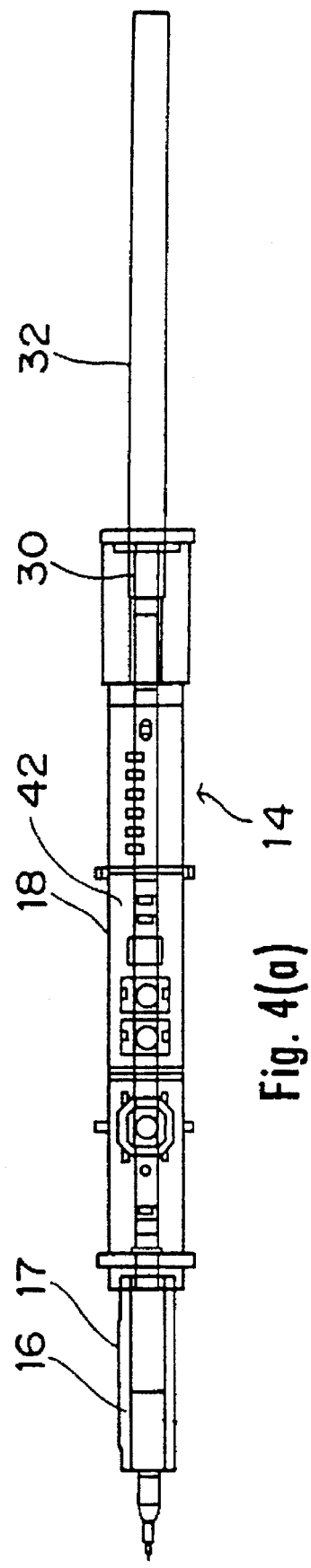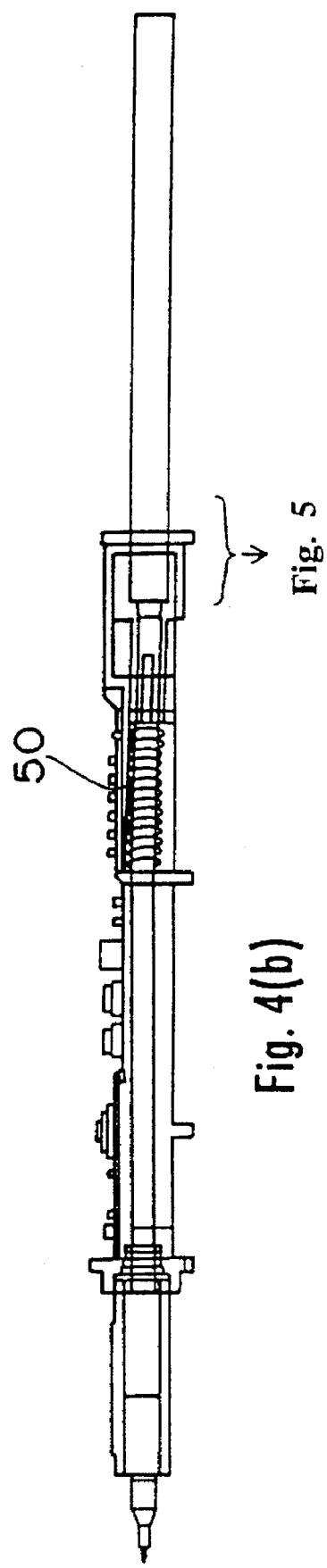
Fig. 4(a)
Fig. 4(b)

PRESSURE SENSITIVE ELEMENT AND A STYLUS PEN WITH PRESSURE SENSITIVE FUNCTION

BACKGROUND OF THE INVENTION

1. Field of the Invention

The present invention relates generally to a pointing device adapted for various coordinate input devices such as a digitizer or a tablet which have been well known as one of the input units of a computer system. Especially, the present invention relates to a pressure sensitive element and a stylus pen using the pressure sensitive element.

2. Description of the Prior Art

Conventional stylus pens used as pointing devices for a digitizer have been constituted for detecting pen-down information in addition to coordinate information on the pointing device. Such pen-down information represents one specific condition: that of the pen point being in contact with a panel of the digitizer. The pen-down information is detected by pressure sensitive means for detecting the vertical pressure applied to the pen point.

As a typical point detecting system for a digitizer, an electromagnetic signal utilizing system has been commonly used. This system comprises a point detecting panel including a plurality of sensor coils arranged in parallel in a detecting direction, and a pointing device such as a pen or a cursor. Since the pointed coordinate information is represented by X and Y coordinates, the detecting area of the sensor panel is composed of two sections intersected perpendicularly in X and Y directions. The pointing device is provided with a coil or resonant circuit to perform electromagnetic interaction between the pointing device and the sensor coils. A typical detecting operation of such constitution will be explained. The sensor coils in the sensor panel transmit electromagnetic waves and then receive response electromagnetic wave re-emitted by the interaction between the transmitted electromagnetic waves and the resonant circuit in the pointing device. The coordinate values of the pointing device are produced by arithmetic operation according to a main sensor signal generating the strongest electromagnetic energy and supplementary sensor signals adjacent to the main sensor.

An electromagnetic signal utilizing system constituted as such provides some advantageous features one of which allows the pointing device to be used without a connection lead; i.e., cordless. The applicant of the present invention has already provided various digitizers according to this electromagnetic signal utilizing system as shown in Japanese Patent Publication No. 2-53805/1990 and Japanese Patent Application Open-Publication No. 3-147012/1991.

FIG. 9 shows a stylus pen type pointing device 300 disclosed in these publications. In detail, the stylus pen 300 includes an external casing 302, as a pen holder, formed in a cylindrical shape made of non-metal material such as plastics, and internal members contained in the casing 302. The internal members include, from the bottom to the top in the drawing, a core member 304; a core support member 306 composed of a ferrite core with a through hole in which the core member 304 is slidably supported and a coil wound around the circumferential surface of the ferrite core; a coil spring 308; a switching member 310; and capacitors 312 and 314. The top end of the casing 302 is provided with a cap 316. The coil 306 and the capacitors 314 define a parallel resonant circuit. The physical properties of these elements of this resonant circuit are previously selected to resonate with the electromagnetic wave from the sensor coils arranged in the sensor panel.

The capacitor 312 is connected to both ends of the coil 306 through the switching member 310 so that the capacitor 312 will act to delay the phase of current flowing through the resonant circuit. When the forward end of the core member 304 is forcibly put in contact with the sensor panel (this operation is referred to as "pen down"), the core member 304 is moved backwards into the interior of the pen holder 302. The rear end of the core member 304 push the switching member 310 backwards through the coil spring 308. Thus the switching member 310 is turned on to change the phase of the response electromagnetic wave generated by the resonant circuit. This change in the phase represent a switching information.

There has been known another stylus pen having a pen pressure sensing function to sense the pressure an operator puts on the pen (hereinafter, referred to "pen pressure") rather than the above described simple on-off switching mechanism. Such pen pressure sensing function is provided by replacing a part of the capacitor or coil of the above described resonant circuit with a variable capacitor or variable coil, or adding a variable resistor to the resonant circuit. These variable elements are easily varied in response to the pen pressure. Such pen pressure sensing type stylus pen is disclosed in Japanese Patent Application Open-Publications No. 63-257823/1988, No. 64-53223/1989, No. 4-96212/1992, No. 5-275283/1993. As the variable resistor, a pressure sensitive conductive rubber has been suggested. However, the pressure sensitive conductive rubber with a desirable response and reproduction ability has not been produced which would give the stylus pen with the required properties.

The core member 304 for the above described conventional stylus pen is not limited to a plastic rod, but any conventional pen point units such as ball point pen and mechanical pencil may also be applied to the core member. These conventional pen point units can also be used to write or mark any required characters or illustrations on the paper sheet laid on the sensor panel in addition to the pen down operation.

For example, FIG. 10 shows a typical structure of the inner unit 200 of ordinarily used mechanical pencils. This type of mechanical pencil is operated by a pushing motion to thrust the pencil point, and further provided at the rear end with a lead feeding means through which supplementary leads are fed. The specific type of mechanical pencil and ball point pen having this push and thrust function are referred to as "push and thrust type writing items" in the present specification. FIG. 10(a) shows one typical example of the knock operative inner unit 200 for a conventional mechanical pencil, commercially available. The inner unit 200 includes a spring actuator which is not shown because it is installed in a lead thrust mechanism 84, and a lead reservoir 86 for reserving spare leads. When the rear end 87 of the lead reservoir 86 is pushed towards the lead thrust mechanism 84, a thrust rod 85 is slidingly moved about 3 mm into the lead thrust mechanism. This thrust motion allows the lead point 112 to move forwards at a predetermined length.

FIG. 10(b) shows an assembled state of the inner unit 200 shown in FIG. 10(a). The inner unit 200 is installed in a pen holder 80 and provided at the rear end with a push button 83 protruded outwardly through a rear opening of the pen holder 80. When a user pushes the push button while holding the pen holder 80, a stepped portion 82 of the thrust mechanism 84 is brought into contact with the tapered inner wall of the pen holder 80 and then the thrust rod 85 is slidingly moved into the lead thrust mechanism 84. Accordingly, the point 112 is protruded outwardly through a front opening of the pen holder 80. The user holds the pen holder 80 and applies the pressure to the point 112 onto a paper sheet to write characters or marks.

In such conventional push and thrust type writing items, the push and thrust or end cap must be removed to supply supplementary leads or replace the inner unit with a new one through the rear opening of the pen holder. As described above, it is advantageous that a conventional writing item is used as a stylus pen. However, it is impossible to combine the core unit of the push and thrust type writing item within a conventional stylus pen because such a conventional stylus pen includes a switch and electronic elements for a resonant circuit which occupy most of the inner space of the pen holder 302 as shown in FIG. 9. This means it is impossible to arrange the lead reservoir or means for replacing the core unit in the rear portion of the stylus pen.

Furthermore, even if the core unit of the push and thrust type writing item is installed in such a conventional stylus pen, it would be impossible to arrange a means for sensing the pressure applied to the point along the longitudinal axis of the stylus pen.

BRIEF SUMMARY OF THE INVENTION

It is therefore an object of the present invention to provide an improved stylus pen with a pen pressure sensing function, which is combined with a push and thrust type writing item.

Another object of the present invention is to provide an improved stylus pen which can be used as an ordinary writing item, and provided with means for supplying leads or replacing a core unit through the rear end of the stylus pen.

An additional object of the present invention is to provide an improved pressure sensitive element for sensing the pressure applied to the pen holder of the stylus pen, which is easily arranged in the stylus pen combined with the writing unit.

A further object of the present invention is to provide an improved pressure sensitive element for sensing the pressure applied to the pen holder of the stylus pen, which has superior response and reproduction properties.

Still another object of the present invention is to provide an improved pressure sensitive element which is extremely compact so as to be installed in a stylus pen combined with a push and thrust type writing item.

To accomplish the above described objects, a pressure sensitive element and a stylus pen according to the present invention is characterized by the following compositions.

(1) A pressure sensitive element comprises a pressure transmittable member, in an annular plate shape, for transmitting the pressure applied to the axial direction of the pressure sensitive element; a pressure sensitive member, in an annular plate shape, arranged coaxially in parallel to the pressure transmittable member; and a support member in an annular plate shape, for supporting the pressure sensitive member between the support member against the pressure, arranged coaxially in parallel to the pressure transmittable member.

(2) In a stylus pen including a pen holder formed substantially in a cylinder shape and a core unit arranged in the axial direction of the pen holder, a pressure sensitive element is installed in the pen holder to detect the pressure applied to the point of the core unit in the longitudinal axial direction of the core unit. The pressure sensitive element comprises a pressure transmittable member, in an annular plate shape to surround the core unit, for transmitting the applied pressure; a pressure sensitive member, in an annular plate shape to surround the core unit, arranged coaxially in parallel to the pressure transmittable member; and a support member in an annular plate shape to surround the core unit, for supporting the pressure sensitive member between the support member against the pressure, arranged coaxially in parallel to the pressure transmittable member.

(3) A stylus pen comprises:
a pen holder formed substantially in a cylinder shape;
a core unit arranged in the axial direction of the pen holder; and
a pressure sensitive element for detecting the pressure applied to the point of the core unit in the longitudinal axial direction of the core unit, which includes a pressure transmittable member, in an annular plate shape to surround the core unit, for transmitting the applied pressure; a pressure sensitive member, in an annular plate shape to surround the core unit, arranged coaxially in parallel to the pressure transmittable member; and a support member in an annular plate shape to surround the core unit, for supporting the pressure sensitive member between the support member against the pressure, arranged coaxially in parallel to the pressure transmittable member.

(4) A stylus pen comprises:
a pen holder formed substantially in a cylinder shape;
a push and thrust type writing unit, arranged to penetrate in the axial direction of the pen holder;
a support member for supporting the writing unit against the push pressure applied by a knock motion through the rear end of the writing unit; and a pressure sensitive element for detecting the pressure applied to the point of the writing unit in the longitudinal axial direction of the writing unit, which includes a pressure transmittable member, in an annular plate shape to surround the writing unit, for transmitting the applied pressure; a pressure sensitive member, in an annular plate shape to surround the writing unit, arranged coaxially in parallel to the pressure transmittable member; and a support member in an annular plate shape to surround the writing unit, for supporting the pressure sensitive member between the support member against the pressure, arranged coaxially in parallel to the pressure transmittable member.

(5) The pressure sensitive member of the pressure sensitive element as disclosed in any one of the above described (1) to (4) is a pressure sensitive conductive rubber which includes non-conductive elastomer, fine carbon spherical particles having a diameter of 1 to 20 μm and hollow elastic microspheres having a diameter of 10 to 150 μm, which particles and microspheres are both dispersed in the elastomer.

(6) The non-conductive elastomer as disclosed in the above described (5) is composed of liquid silicone rubber and silicone adhesive consisting of silicone crude rubber and silicone varnish, or consisting mainly of silicone crude rubber and silicone varnish.

(7) The hollow elastic microspheres as disclosed in the above described (5) or (6) includes shells made of copolymer of vinylidene chloride and acrylonitrile.

In the pressure sensitive element according to the present invention, the pressure transmittable member can transmit the pressure applied in the axial direction of the pressure sensitive element to the pressure sensitive member arranged coaxially in parallel to the pressure transmittable member and supported by the support member arranged coaxially in parallel to the pressure transmittable member. A thus constituted pressure sensitive element can detect the pressure applied in the axial direction even when the pressure sensitive element is not exactly located in the axial direction.

In the pressure sensitive element installed in a stylus pen according to the present invention, the pressure transmittable member can transmit the pressure applied in the axial direction of the pressure sensitive element to the pressure sensitive member arranged coaxially in parallel to the pressure transmittable member and supported by the support member arranged coaxially in parallel to the pressure transmittable member. This thus constituted pressure sensitive element can detect the pressure applied in the axial direction even when the pressure sensitive element is not exactly located in the axial direction of the stylus pen.

In the stylus pen including the pressure sensitive element according to the present invention, the pressure transmitting member can transmit the pressure applied in the axial direction of the core unit to the pressure sensitive member arranged coaxially in parallel to the pressure transmittable member and supported by the support member arranged coaxially in parallel to the pressure transmittable member. This thus constituted pressure sensitive element can detect the pressure applied to the point of the core unit even when the pressure sensitive element is not exactly located in the axial direction of the core unit. Furthermore, a such constituted pressure sensitive element can detect the pressure applied to the point of the core unit even when the core unit penetrates through the pen holder of the stylus pen.

In the stylus pen including the push and thrust type writing unit arranged to penetrate through the pen holder according to the present invention, exchange and refill works through the rear end of the pen holder can be easily carried out in the same manner as ordinary writing items which are provided with means to exchange the core unit and refill leads.

Since the pressure sensitive member of the pressure sensitive element according to the present invention is made of pressure sensitive conductive rubber having superior reproduction ability, a stylus pen having stable pressure detecting properties can be realized.

These and other objects, features and advantages of the invention will become more apparent upon reading the following detailed specification and drawings.

BRIEF DESCRIPTION OF THE DRAWING

FIG. 4(a) and FIG. 4(b) are schematic illustrations showing a pencil unit combined with a pointing device and a pressure sensitive element according to the present invention;

DETAILED DESCRIPTION OF THE PREFERRED EMBODIMENT

Figure 1A:
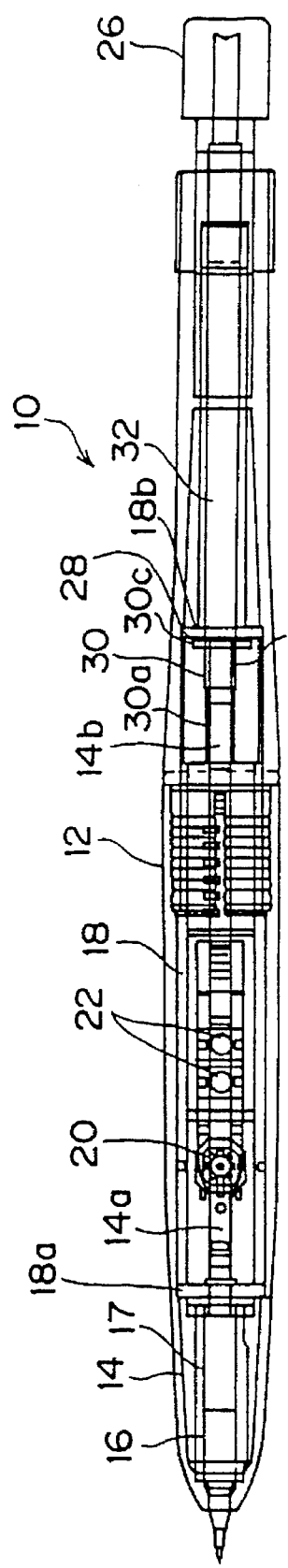
FIG. 1(a) is a schematic perspective elevational view showing one embodiment of stylus pen which includes a mechanical pencil inner unit as a core unit.
Figure 1B:
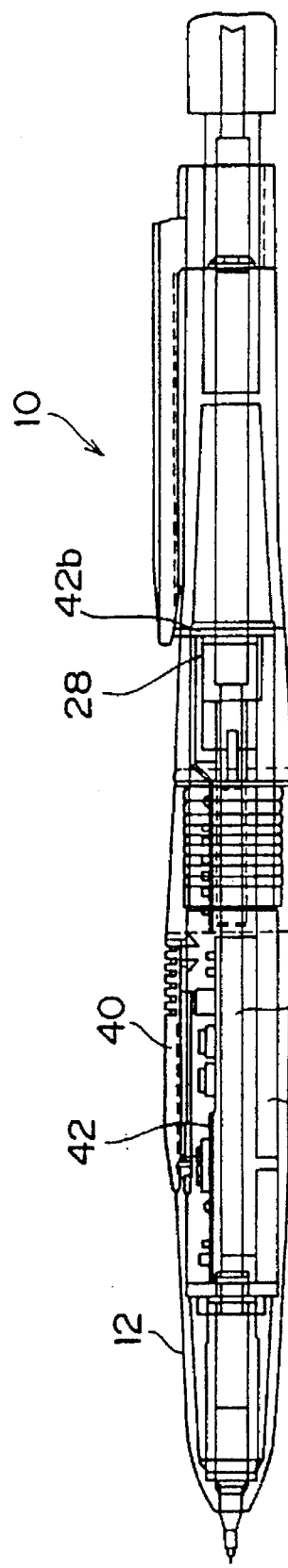
FIG. 1(b) is a schematic perspective side view of the stylus pen shown in FIG. 1(a)
Figure 1C:
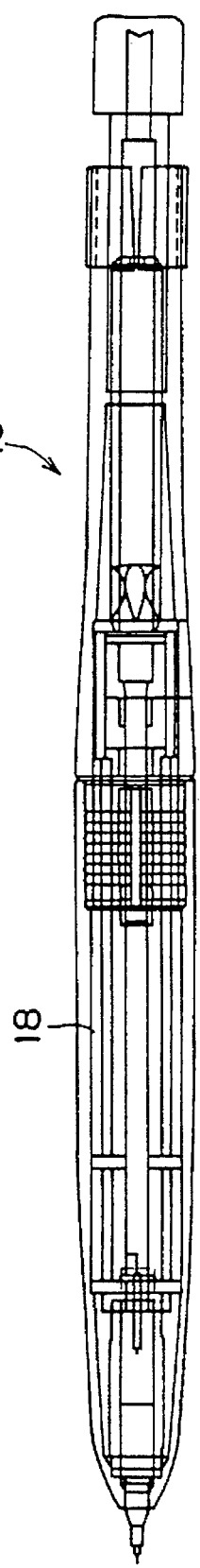
FIG. 1(c) is a schematic perspective backside view of the stylus pen shown in FIG. 1(a)

The present invention will be understood by discussing some preferred embodiments in conjunction with the accompanying drawings. FIG. 1 shows one embodiment of stylus pen 10 which includes a mechanical pencil inner unit 14 as a core unit. FIG. 1(a) shows the elevational view, FIG. 1(b) shows the side view, and FIG. 1(c) shows the backside view. In this specification, the front end or front side of the stylus pen represents the pen point or nearby it, which is brought into contact with a sensor panel of a digitizer or the like, and the rear end or rear side represents the opposite end or side of the front end.

This mechanical pencil type stylus pen comprises an external casing in a cylinder shape as a pen holder 10 made of non-metal material such as plastic and an inner unit installed in the pen holder 10. The inner unit includes a pencil unit 14, a ferrite core 16 with a through opening for slidably receiving the front side portion of the pencil unit 14, and a coil 17 wound around the ferrite core 16.

The pen holder 12 is commonly constructed in two sections; for example, a front section and a rear section which are meshed to assemble. The pencil unit 14 has the same structure as the inner unit of conventional mechanical pencils. This pencil unit 14 is installed in the pen holder 12 so as to be slidably arranged in the axial direction of the pen holder 12. The pen holder 12 is provided with a front opening and a rear opening so that the point of the pencil unit 14 protrudes out of the front opening.

The ferrite core 16 is provided at its rear end with a base member 18 in a substantially cylindrical shape which is immovably fixed within the pen holder 12. The cylindrical base member 18 is provided with a front plate 18a whose center is formed with a through opening through which the pencil unit 14 is slidably moved. Also the cylindrical base member 18 is provided with a rear plate 18b similar to the front plate 18a.

The cylindrical base member 18 is further provided with a flat surface formed in one side of the base member 18, on which a flexible plate 42 is set. The flexible plate 42 is a support plate for receiving the electronic components for the pointing device such as a variable capacitor 22 and a switching member 20. This switching member 20 is turned on when a switch cover 40 arranged on the pen holder 12 is shifted or pressed.

The pencil unit 14 includes a lead reservoir 14a whose rear end 14b is fixedly engaged with a front section 30a of a pressure transmittable member 30. The lead reservoir 14a is generally made of brass. The pressure transmittable member 30 is formed in a substantially cylindrical shape and acts as a part of the pencil unit 14 after engaging with the lead reservoir 14a. Since the pressure transmittable member 30 is formed in a hollow cylindrical shape, leads can be fed into the lead reservoir 14a through the pressure transmittable member 30. Furthermore, the pressure transmittable member 30 is provided with an annular shoulder 30b whose diameter is greater than the other sections and rear end surface is flattened. The functional explanation on this pressure transmittable member 30 will be described later.

As shown in FIG. 1, since the pencil unit 14 and its associated members are arranged along the longitudinal axis of the pen holder 12 from the front end to the rear end, conventional pressure detecting mechanisms to detect the pressure applied to the pen point can not be arranged along the longitudinal axis of the pen holder 12. In order to resolve this problem, the present invention provides a pressure sensitive element and its associated members in an annular or hollow shape which can be arranged surrounding the pencil unit 14.

The cylindrical base member 18 includes a rear end surface 18b (FIGS. 1 and 5) which is formed in an annular flat surface having a center opening through which the pencil unit 14 is installed. The rear end surface 18b of the cylindrical base member 18 and the annular shoulder 30b sandwich a pressure sensitive conductive rubber 28 and an extended section 42b of the flexible plate 42 therebetween. This extended section 42b is also formed in an annular shape and provided with an annular electrode pattern. The rear end surface 18b acts as a support member against the pressure from the annular shoulder 30b of the pressure transmittable member 30. This will be later described in detail in conjunction with FIG. 5.

The rear end section 30c of the pressure transmittable member 30 is fixedly connected to a plastic pipe 32 so that the hollow space of the plastic pipe 32 is also used as a passage for feeding leads into the lead reservoir 14a. The diameter of the through opening formed in the cylindrical base member 18 is slightly greater than the external diameter of the plastic pipe 32 so that the plastic pipe 32 can be slidingly moved through the through opening to engage with the pressure transmittable member 30. The other end (rear end) of the plastic pipe 32 is covered with a cap 26 which is conventionally used in the push and thrust type mechanical pencils. Accordingly, the cap 26 is used as a push button to drive the lead point forwardly.

Figure 2A:
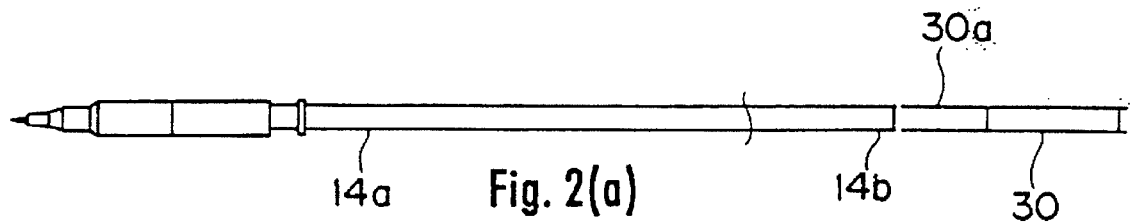
FIG. 2(a) to FIG. 2(d) are schematic illustrations showing a pencil unit and its associated members to be installed in the stylus pen shown in FIG. 1.

The pencil unit 14 and its associated members are shown in FIG. 2(a) to FIG. 2(d) in detail. FIG. 2(a) shows the pencil unit 14 prior to assembly and a part of the pressure transmittable member 30. The lead reservoir 14a is a space to stock spare leads.

Figure 2B:
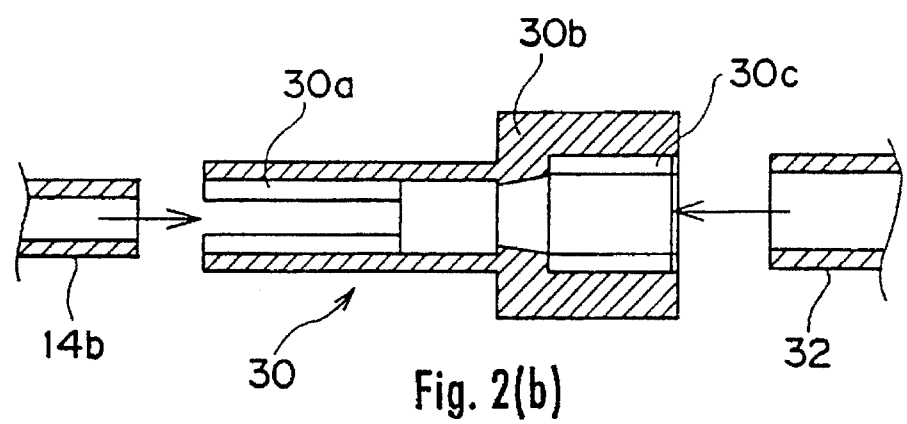

FIG. 2(b) is a sectional view which shows the pressure transmittable member 30, the lead reservoir end 14b and the front end of the plastic pipe 32 which are assembled together. The front section 30a is formed with side slits to hold elastically the lead reservoir end 14b. As shown in FIG. 2(b), the lead reservoir 14a, the pressure transmittable member 30, and the plastic pipe 32 are coaxially assembled so as to define a through passage to feed leads from the rear end of the stylus pen into the lead reservoir 14a.

Figure 2C:
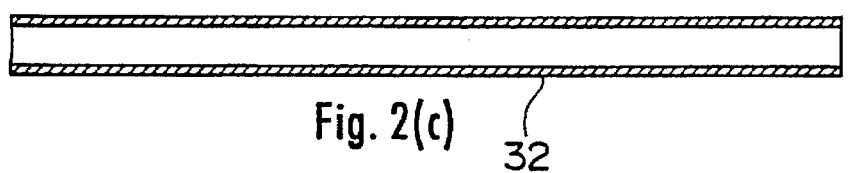
Figure 2D:
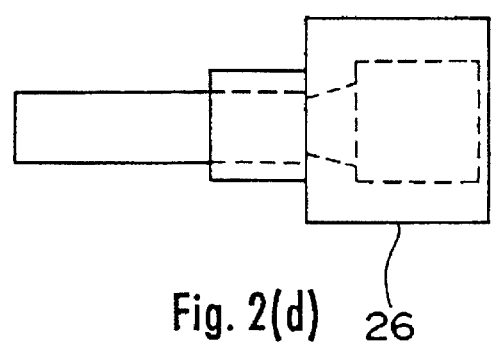

FIG. 2(c) is a sectional view showing the plastic pipe 32. FIG. 2(d) is a view of the cap 26 mounted on the rear end of the plastic pipe 32. The cap 26 should be removed to feed leads into the lead reservoir 14a. Besides this refill operation, the cap 26 is used as a push button to drive the lead point forward.

Figure 3:
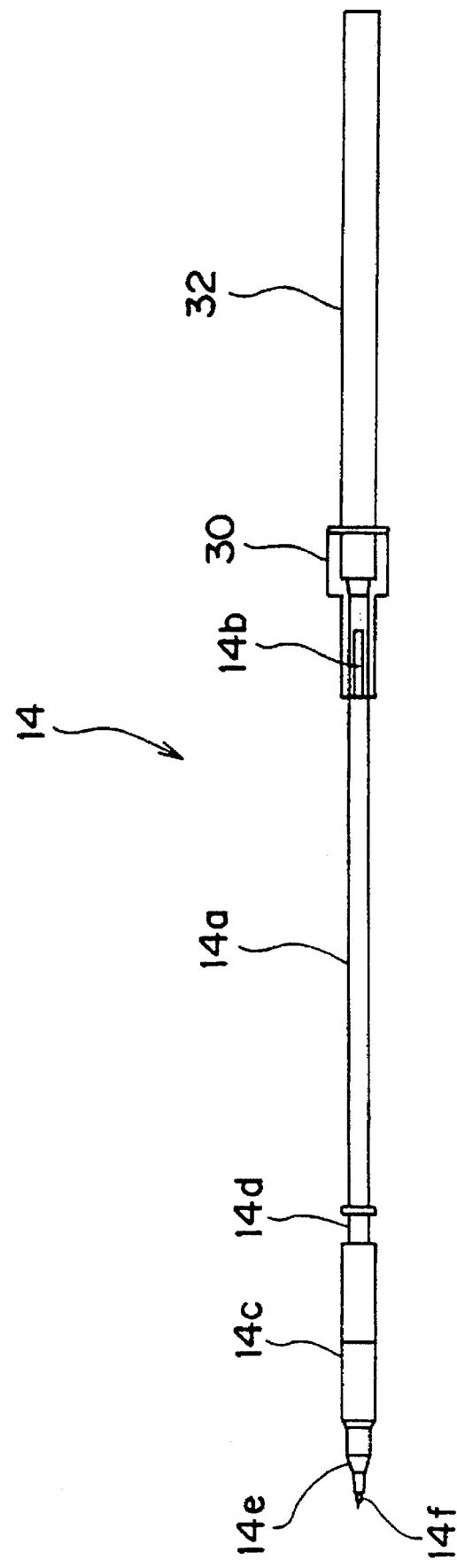
FIG. 3 is a schematic perspective view showing an assembled pencil unit installed in the stylus pen shown in FIG. 1.

FIG. 3 is an overall view of the assembled pencil unit 14 composed of from the front end to the rear end, a point 14f, a tapered portion 14e, a thrust unit 14c, and a thrust rod 14d in addition to the lead reservoir 14a, the reservoir end 14b, the pressure transmittable member 30 and the plastic pipe 32.

FIG. 4(a) is an elevational schematic view showing the external appearance of the pencil unit 14 combined with a pointing device and a pressure sensitive element according to the present invention. FIG. 4(b) shows the side of the same unit. The pencil unit 14 is further provided with a coil spring 50 for retaining the unit 14 within the pen holder, i.e. elongated housing 12. In the state shown in FIG. 4, the extended section 42b (FIG. 5) of the flexible plate 42 and the pressure sensitive conductive rubber 28 are interposed and supported between the pressure transmittable member 30 and the cylindrical base member 18.

Figure 5A:
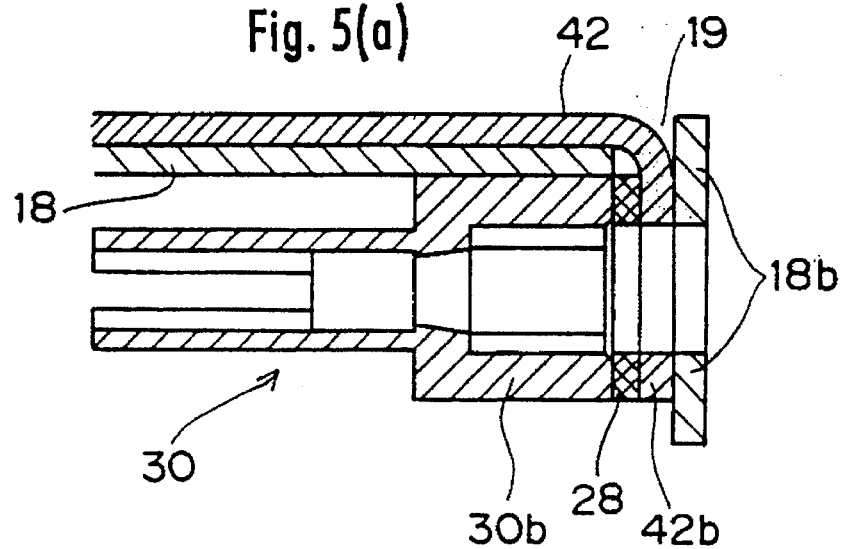
FIG. 5(a) is a sectional view showing a pressure sensitive means indicated in FIG. 4(b)
Figure 5B:
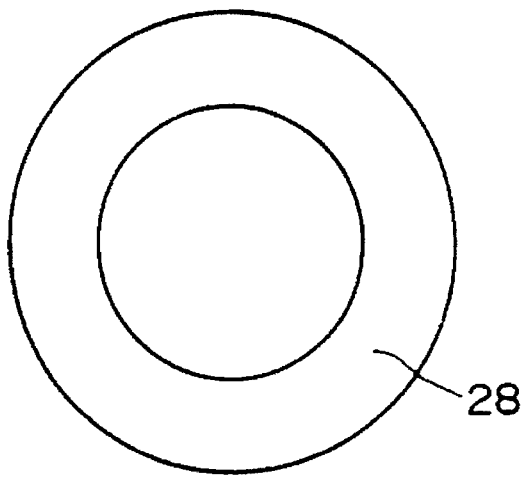
FIG. 5(b) is a schematic illustration showing an annular pressure sensitive conductive rubber of the pressure sensitive means shown in FIG. 5(a)
Figure 5C:
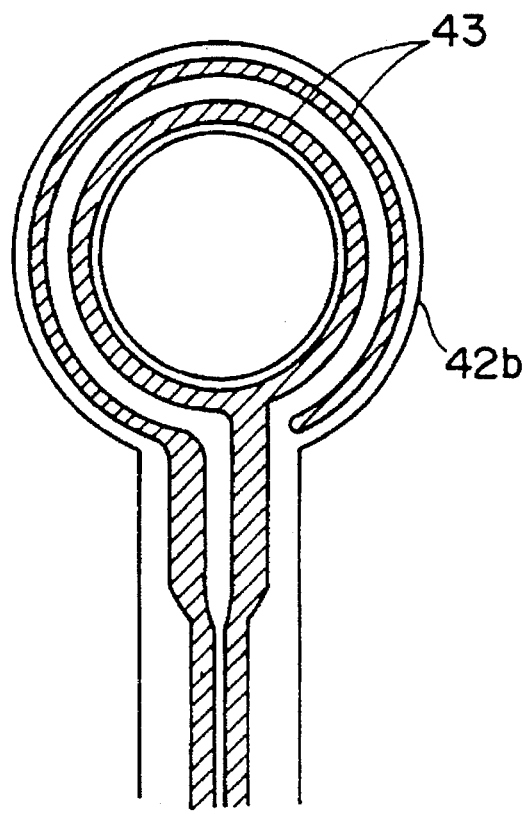
FIG. 5(c) is a schematic illustration showing an extended section of a flexible plate of the pressure sensitive means shown in FIG. 5(a)

FIG. 5(a) is a cross sectional view of the constitution of pressure sensitive means including the pressure transmittable member 30, the pressure sensitive conductive rubber 28, the cylindrical base member 18 and the extended section 42b of the flexible plate 42. These members are formed in a coaxially annular shape surrounding the pencil unit 14. Although the flexible plate 42 is fixed on the flat surface of the cylindrical base member 18, the extended section 42b is bent and inserted into a slit 19 formed in the cylindrical base member 18. FIG. 5(b) is a plan view of the pressure sensitive conductive rubber 28 formed in an annular plate. FIG. 5(c) is also a plan view of the extended section 42b of the flexible plate 42. On one surface of the extended section 42b two annular electrode patterns 43 are formed. The pressure sensitive conductive rubber 28 is overlapped on the annular electrode patterns 43 when the pressure sensitive conductive rubber 28 and the extended section 42b are assembled with pressure transmittable member 30. Accordingly, the resistance of the pressure sensitive conductive rubber 28 between the two electrode patterns 43 is varied in accordance with the pressure applied to the pressure sensitive conductive rubber 28. Thus the change in the pressure can be detected by the electrical signal corresponding to the change in the resistance between the electrode patterns 43.

Under the pressure-free condition, the shoulder 30b, the pressure sensitive conductive rubber 28 and the electrode patterns 43 are softly in contact with each other. When an operator pushes the pen point of this constituted stylus pen onto the sensor panel of the point detecting device, the pressure applied to the point is transmitted to the pressure transmittable member 30 through the pencil unit. The shoulder 30b of the pressure transmittable member 30 is moved slightly towards the rear plate 18b of the cylindrical base member 18. Since the cylindrical base member 18 is fixed within the pen holder 12, the shoulder 30b compresses the pressure sensitive conductive rubber 28 and the electrode patterns 43 to the rear plate 18b. Consequently, the pressure is finally applied to the pressure sensitive conductive rubber 28 and the electrode patterns 43. The resistance of the pressure sensitive conductive rubber 28 is varied in accordance with the applied pressure. This varied resistance is detected via the electrode patterns 43.

In this embodiment, the shoulder 30b of the pressure transmittable member 30 acts as a compressing means for applying the pressure to the pressure sensitive member. Such a compressing means is not limited only to this configuration, but any member fixed to the core unit of the stylus pen and integrally moved with the core unit may also be used as such a compressing means. For example, the external surface of the core unit can partially protruded to apply the pressure to the pressure sensitive member or another annular member can be fixed or connected to the core unit. The present invention requires the compressing means to at least have an annular flat surface facing the pressure sensitive member.

The rear plate 18b of the cylindrical base member 18 may be replaced by any plates fixed to the pen holder 12 so as to immovably support the pressure sensitive member against the pressure applied to the core unit 14. For example, an annular plate protruded from the inner wall of the pen holder 12 may be employed. The present invention requires that this support member be immovably fixed to the pen holder and at least have an annular flat surface facing the pressure sensitive member.

As shown in the embodiment of the present invention: the transmitting member 30, the pressure sensitive member 28 and the electrode patterns 43 are preferably formed in an annular shape. But, this annular shape is not limited to a perfect circle as shown in FIG. 5(b). The annular shape according to the present invention can also be arranged as (1) a discontinuous circle composed of a plurality of arc sections, (2) a partial circle partially surrounding around the core unit and a somewhat circular shape such as a polygon shape or an oval shape. The continuous perfect circle is the most preferable because an operator may hold different portions of the stylus pen. If the pressure sensitive element is partially arranged on the circumferential surface of the core unit, a blind spot where the pressure sensitive element can not detect the pressure applied to the pen point would occur in response to the grip or holding position of the operator. In this case, any guide mechanism may be arranged on the pen holder to allow the operator to hold the same position. Furthermore, the present invention requires that there be secure coaxial through openings in the annular members of the pressure sensitive means such as the pressure transmittable member 30, the pressure sensitive member 28 and the electrode patterns 43 so that the core unit can be arranged to extend through the through openings.

It is noted that the pressure is always transmitted from the core unit to the pressure sensitive member 28 through the flat surface of the pressure transmittable member 30. Therefore the annular members of the pressure sensitive means should be adjusted to minimize the friction generated between the annular members and the core unit to prevent the detection from being affected by the friction.

A typical operation of the stylus pen including the mechanical pencil with the push and thrust mechanism as shown in FIG. 1 to FIG. 3 will be described. An operator holds the pen holder 12 and pushes the cap 26 forward by a pressure of a several hundred gram-force. The pressure applied to the cap 26 is applied to the pencil unit 14 including: the plastic pipe 32, the pressure transmittable member 30, the lead reservoir 14a, the thrust rod 14d, the thrust unit 14c, and the point 14f. The pencil unit 14 is immovably supported by the pen holder 12 because the tapered portion 14e is in contact with the inner wall of the pen holder 12. As a result, the thrust rod 14d is plunged into the thrust unit 14c so that the lead point is forcibly thrusted.

Although the coil spring 50 is arranged to retain the core unit and return the pushed cap 26, this coil spring 50 is preset to be depressed by the pressure of at least a several hundred gram-force. On the other hand, the pressure required for detecting the pen-down operation or pen pressure is a several ten gram-force which does not affect the coil spring 50. Accordingly, the pen pressure applied to the pen point is directly transmitted to the pressure sensitive element.

Figure 6:
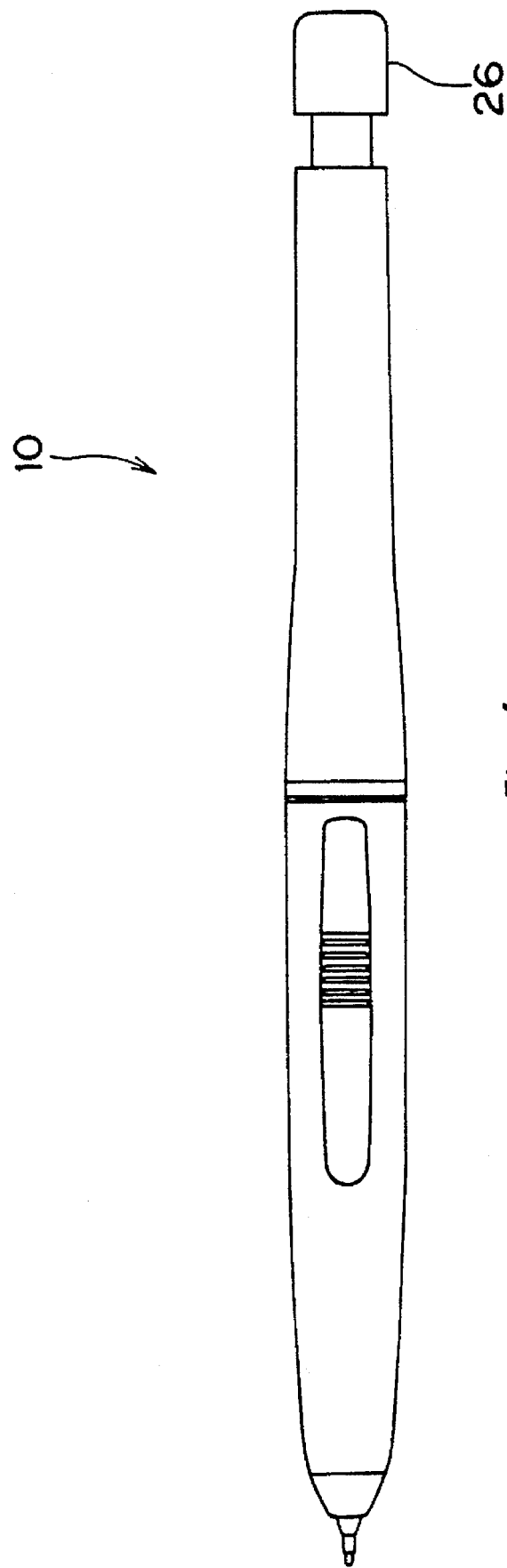
FIG. 6 is a schematic illustration showing an external appearance of the stylus pen according to the present invention.

FIG. 6 shows an appearance of the stylus pen 10 embodied according to the present invention. As disclosed above, this stylus pen 10 can act as a conventional mechanical pencil such as lead point thrust operation by pushing the rear end cap 26 and lead refill operation by removing the cap 26.

In the stylus pen including the pencil unit 14, various commercially available leads may be used, for example, various diameters (0.5, 0.7, 0.9 mm), various hardness (H, HB, B), various colors (black, red, green, blue, white). Even when a white lead is used to write on a white paper sheet, marks are not shown. The use of such white lead provides a benefit for improving in point feeling. In other words, such white lead is abraded by the writing motion so that the point of the stylus pen can be smoothly moved. The point made of plastics can not provide such a smooth feeling.

The present invention also allows a ball point pen to be used as the core unit of the above described push and thrust type stylus pen. For example, a core unit of a conventional ball point pen is arranged along the longitudinal axis of the pen holder from the point to the rear end. In this configuration, the core unit may be exchanged for a new one through a rear end opening.

Other push and thrust type writing units may be applied to the stylus pen according to the present invention in addition to mechanical pencils and ball point pens.

Figure 7:
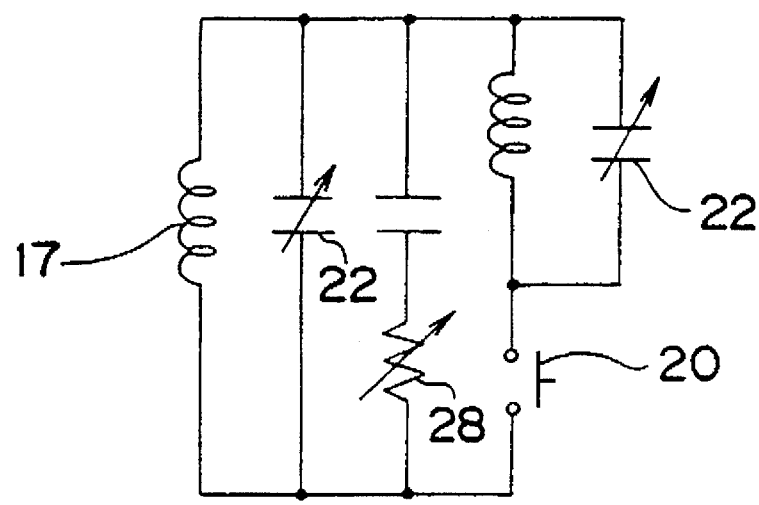
FIG. 7 is a circuit diagram showing an example of resonant circuit associated with the stylus pen according to the present invention.

FIG. 7 is a circuit diagram which shows the resonant circuit of the stylus pen 10 shown in FIG. 1. As disclosed before, this stylus pen has no connection cable and utilizes electromagnetic communication for detecting the point on the digitizer. In this circuit diagram, the pressure sensitive conductive rubber 28 is represented by a variable resistor. As the resistivity of the variable resistor is varied, the reactance or Q factor of this resonant circuit is also varied. The pen pressure is detected in response to this varied value of the reactance or Q factor. The circuit diagram shown in FIG. 7 further includes an additional variable capacitor 23 for fine-tuning the resonant frequency of this resonant circuit.

The present invention is not limited only to the above described stylus pen adapted for the digitizer utilizing the electromagnetic communication, but can also applied to any type of stylus pen, for example with an active signal processor associated with a built-in power source.

As discussed above, in the embodiment of the present invention, the pressure sensitive conductive rubber is employed as the pressure sensitive means for detecting pen pressure. Conventionally used pressure sensitive conductive rubber is not preferable to detect the pressure repeatedly applied to the pen point over a long period. In detail, conventional pressure sensitive conductive rubbers have poor durability against mechanical impact and deformation, poor response ability for pressure, and poor reproducibility of pressure-resistance characteristic owing to hysteresis effects of the pressures previously applied.

In order to resolve these defects, the pressure sensitive conductive rubber used in the present invention is made of the composite material including a non-conductive elastomer as a binder, and fine carbon spherical particles and hollow elastic microspheres as fillers dispersed in the binder. For example, in the embodiment of the present invention, the carbon spherical particles having diameter of 1 to 20 μm and the hollow elastic microspheres having diameter of 10 to 150 μm are preferably used. The non-conductive elastomer is composed of liquid silicone rubber and silicone adhesive consisting of silicone crude rubber and silicone varnish, or consisting mainly of silicone crude rubber and silicone varnish.

Preferably, the hollow elastic microsphere includes shells made of a copolymer of vinylidene chloride and acrylonitrile. This hollow elastic microsphere is remarkably excellent in elasticity and impact absorbency.

Figure 8A:
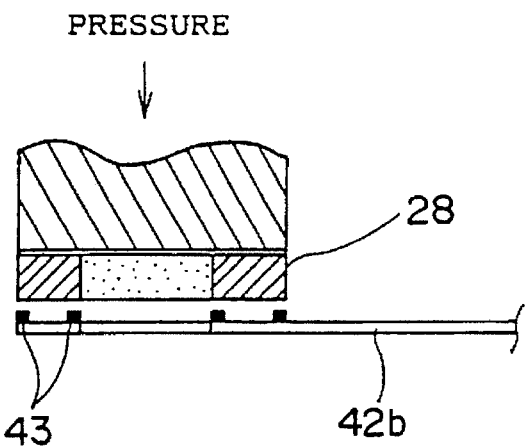
FIG. 8(a) is a schematic sectional illustration showing an experimental test for measuring the pressure and resistance characteristic of the pressure sensitive conductive rubber used in the stylus pen according to the present invention.
Figure 8B:
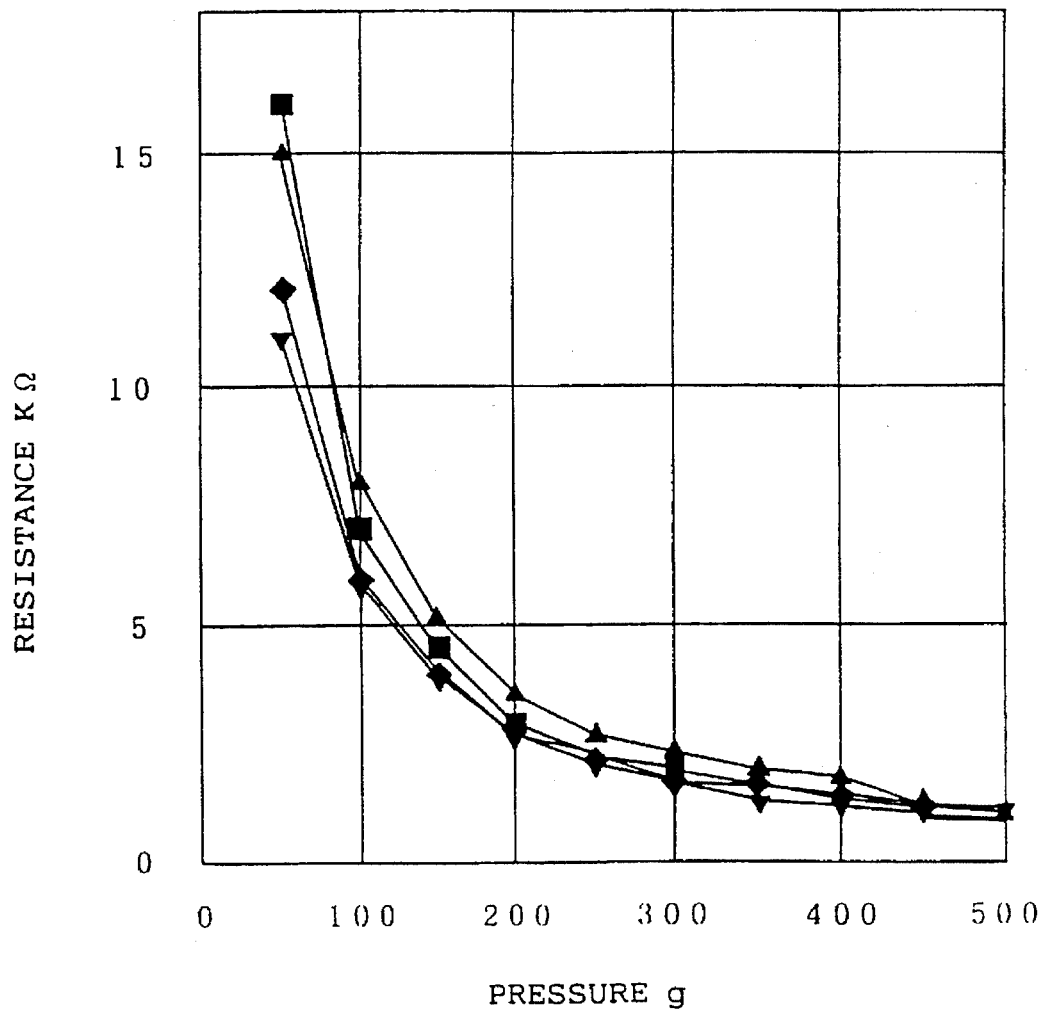
FIG. 8(b) is a graphical diagram showing the pressure and resistance characteristic curves the resulted from the experimental test shown in FIG. 8(a)
Figure 9:
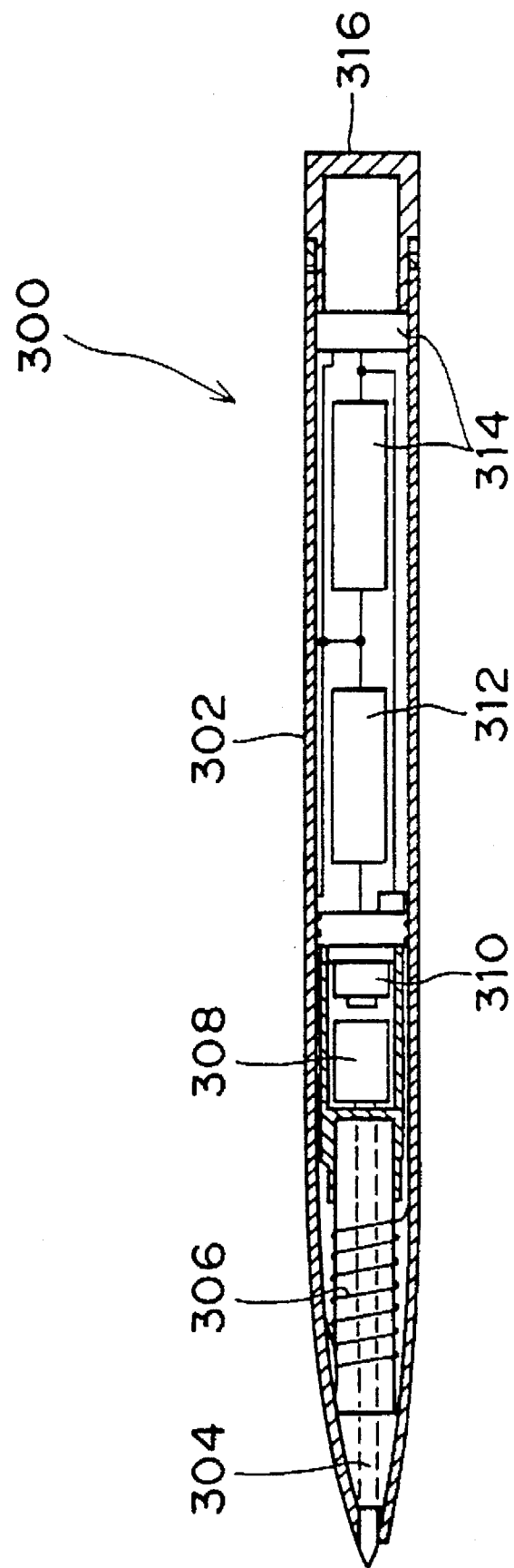
FIG. 9 is a schematic sectional view showing a typical conventional stylus pen.
Figure 10A:
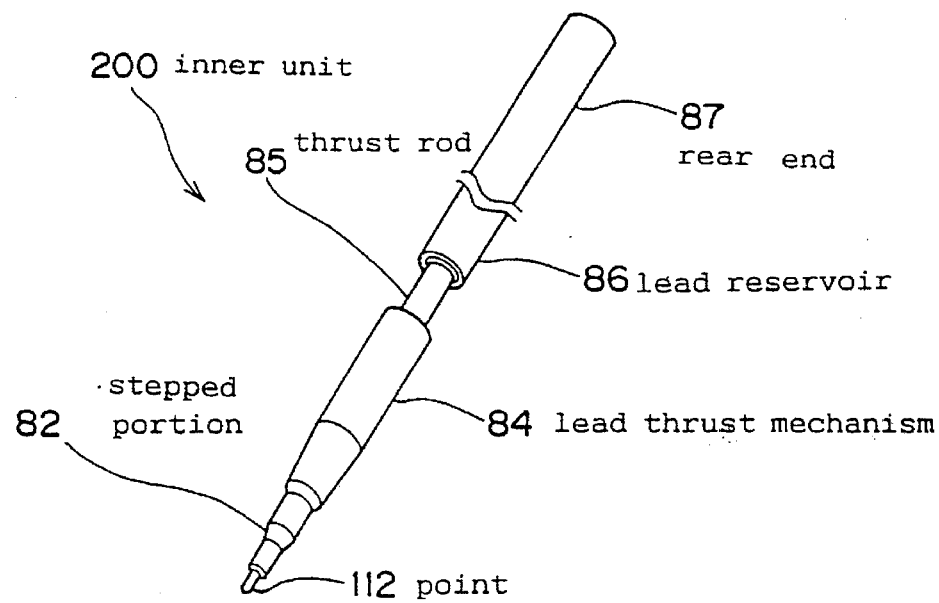
FIG. 10(a) and FIG. 10(b) are schematic perspective illustrations showing a conventional mechanical pencil.
Figure 10B:
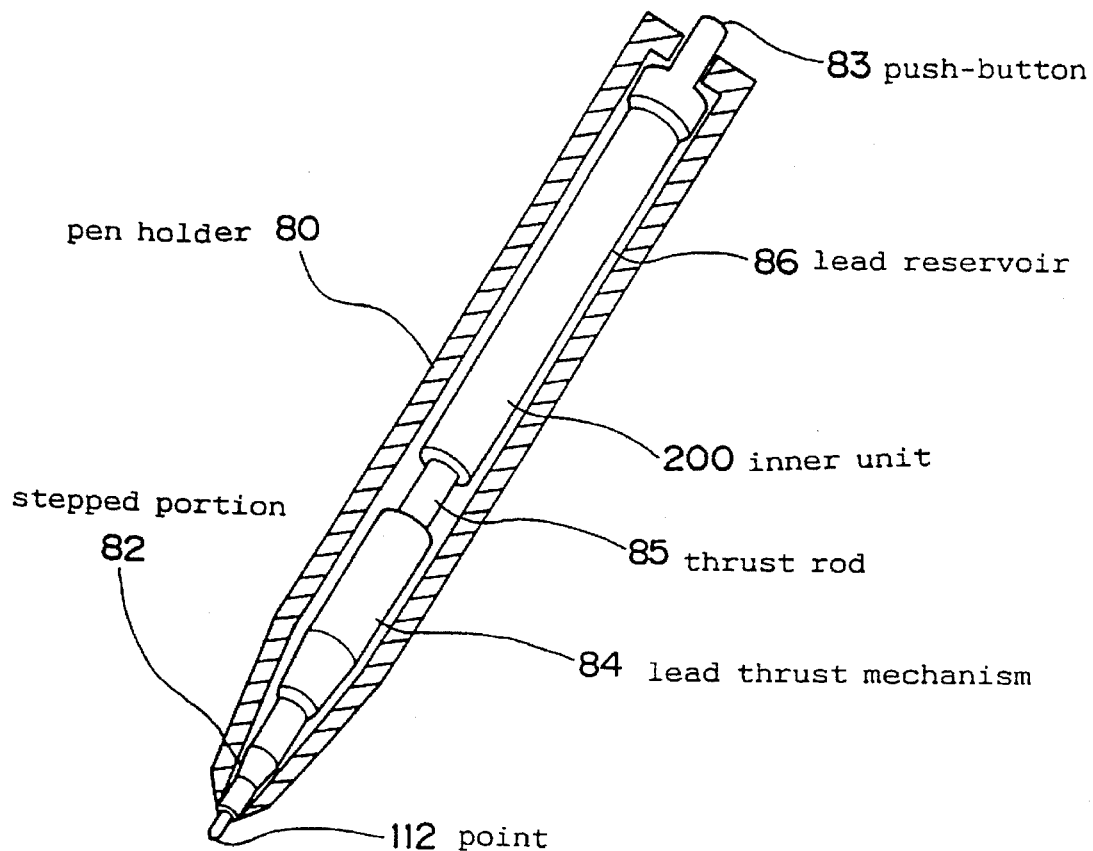

FIG. 8(a) is a schematic drawing of an experimental arrangement for measuring the pressure and resistance characteristic of the pressure sensitive conductive rubber used in the stylus pen according to the present invention, and FIG. 8(b) is a diagram of the pressure and resistance characteristic curves which resulted from the experimental test performed by the apparatus shown in FIG. 8(a). The pressure sensitive conductive rubber 28 was overlapped on the electrode patterns 43 formed on the extended section 42b of the flexible plate 42 shown in FIG. 5, and pressure was applied onto the pressure sensitive conductive rubber 28. As the applied pressure was varied, the variation in the resistance between the electrode patterns 43 was measured. This test was repeated on four samples. As is clear from these resulted curves, the resistance is sharply decreased in the range of tens of grams corresponding to pen pressure. This means the pressure sensitive conductive rubber 28 is excellent in response and reproduction ability.

As disclosed above, the present invention can provide a stylus pen including the push and thrust type writing core unit arranged to penetrate in the longitudinal axis of the stylus pen, and the pressure sensitive element for detecting the pressure applied to the pen point. The pressure sensitive element including a variable resistor member such as a pressure sensitive conductive rubber is formed in an annular shape through which the core unit is arranged. However, the present invention is not limited to only this configuration, but other modifications are also available. For example, the pressure sensitive element may be replaced by a conventional mechanical switching means. Furthermore, other modifications may include an annular pressure sensitive member utilizing a variable inductance or variable capacity.

Since the pressure sensitive conductive rubber having the composition defined by the present invention provides highly superior characteristics, this pressure sensitive conductive rubber can be broadly applied to conventional stylus pens without writing means to improve their pen pressure sensitivity.

In the pressure sensitive element according to the present invention, the pressure transmittable member can transmit the pressure applied in the axial direction of the pressure sensitive element to the pressure sensitive member arranged coaxially in parallel to the pressure transmittable member and supported by the support member arranged coaxially in parallel to the pressure transmittable member. This thus constituted pressure sensitive element can detect the pressure applied in the axial direction even when the pressure sensitive element is not exactly located in the axial direction. This configuration permits other means such as writing means to be arranged along the longitudinal axis. This means the limitations under design are reduced.

In the pressure sensitive element installed in a stylus pen according to the present invention, the pressure transmittable member can transmit the pressure applied in the axial direction of the pressure sensitive element to the pressure sensitive member arranged coaxially in parallel to the pressure transmittable member and supported by the support member arranged coaxially in parallel to the pressure transmittable member. This thus constituted pressure sensitive element can detect the pressure applied in the axial direction.

In the stylus pen including the push and thrust type writing unit arranged penetratingly through the pen holder according to the present invention, exchange and refill through the rear end of the pen holder can be easily carried out in the same manner as with ordinary writing items which are provided with means to exchange the core unit and refill leads. Such a constitution allows operators to use this stylus pen as a common writing item.

When an operator uses the stylus pen including the writing unit, the operator may retain the marks or characters on the same occasion of pointing operation. Furthermore, the pressure sensitive element assembled on the stylus pen according to the present invention can electrically detect the strength of the pressure applied to pen point. In other words, the line pointed by the writing unit can be identified in response to type of lines such as solid line, dotted line, thick line and so on. This constitution can realize delicate pointing operations.

As many apparently widely differing embodiments of this invention may be made without departing from the spirit and scope thereof, it is to be understood that the invention is not limited to the specific embodiments thereof except as defined in the appended claims.

What is claimed is:

1. A pressure sensitive element formed substantially in a disk shape comprising:

a pressure sensitive member, in an annular plate shape, a pressure transmitting member, in an annular plate shape, for transmitting pressure applied in the axial direction of the pressure sensitive element;

the pressure sensitive member being arranged coaxially with the pressure transmitting member along the axial direction; and a support member for supporting the pressure sensitive member, the pressure sensitive member being between the support member and the pressure transmitting member, and being arranged coaxially with the pressure transmittable member along the axial direction, the electrode having an annular plate shape, the variable resistor being made of pressure sensitive conductive rubber, the pressure sensitive conductive rubber including non-conductive elastomer, fine carbon spherical particles having a diameter of 1 to 20 μm and hollow elastic microspheres having a diameter of 10 to 150 μm, which particles and microspheres are both dispersed in the elastomer.

2. The pressure sensitive element as set forth in claim 1, wherein the above described non-conductive elastomer is composed of liquid silicone rubber and silicone adhesive consisting of silicone crude rubber and silicone varnish, or consisting mainly of silicone crude rubber and silicone varnish.

3. The pressure sensitive element as set forth in claim 1, wherein the hollow elastic microspheres include shells made of copolymer of vinylidene chloride and acrylonitrile.

4. An stylus pen comprising:

a pen holder having a substantially cylindrical shape;

a core unit arranged in the axial direction of the pen holder; and a pressure sensitive element for detecting the pressure applied to the point of the core unit in the longitudinal axial direction of the core unit, which includes a pressure transmitting member, in an annular plate shape to surround the core unit, for transmitting applied pressure; a pressure sensitive member, in an annular plate shape to surround the core unit, arranged coaxially with the pressure transmitting member along the axial direction; and a support member in an annular plate shape to surround the core unit, for supporting the pressure sensitive member, the pressure sensitive member being between the support member and the pressure transmitting member and being arranged coaxially with the pressure transmittable member along the axial direction, the pressure sensitive disk being a variable resistor, the variable resistor being a pressure sensitive conductive rubber, the pressure sensitive conductive rubber including non-conductive elastomer, fine carbon spherical particles having a diameter of 1 to 20 μm and hollow elastic microspheres having a diameter of 10 to 150 μm, which particles and microspheres are both dispersed in the elastomer.

5. The stylus pen as set forth in claim 4, wherein the above described non-conductive elastomer is composed of liquid silicone rubber and silicone adhesive consisting of silicone crude rubber and silicone varnish, or consisting mainly of silicone crude rubber and silicone varnish.

6. The stylus pen as set forth in claim 4, wherein the hollow elastic microsphere includes shells made of copolymer of vinylidene chloride and acrylonitrile.

7. A stylus pen comprising:

a pen holder having a substantially cylindrical shape;

a push and thrust type writing unit, arranged in the axial direction of the pen holder so as to penetrate the holder;

a support member for supporting the writing unit against the push pressure applied by a knock motion through the rear end of the writing unit; and a pressure sensitive element for detecting the pressure applied to the point of the writing unit in the longitudinal axial direction of the writing unit, which includes:

a pressure transmitting member, in an annular plate shape to surround the writing unit, for transmitting applied pressure; a pressure sensitive member, in an annular plate shape to surround the writing unit, arranged coaxially with the pressure transmitting member along the axial direction; and a support member in an annular plate shape to surround the writing unit, for supporting the pressure sensitive member, he pressure sensitive member being between the support member and the pressure transmitting member and being arranged coaxially with the pressure transmittable member along the axial direction, the pressure sensitive disk being a variable resistor, the variable resistor being a pressure sensitive conductive rubber, the pressure sensitive conductive rubber including non-conductive elastomer, fine carbon spherical particles having a diameter of 1 to 20 μm and hollow elastic microspheres having a diameter of 10 to 150 μm, which particles and microspheres are both dispersed in the elastomer.

8. The stylus pen as set forth in claim 7, wherein the above described non-conductive elastomer is composed of liquid silicone rubber and silicone adhesive consisting of silicone crude rubber and silicone varnish, or consisting mainly of silicone crude rubber and silicone varnish.

9. The stylus pen as set forth in claim 7, wherein the hollow elastic microsphere include shells made of copolymer of vinylidene chloride and acrylonitrile.

* * * * *